United States Patent
Bang et al.

(10) Patent No.: US 7,736,188 B2
(45) Date of Patent: Jun. 15, 2010

(54) ELECTRODE CONNECTOR CONTAINING PLATE AND BATTERY MODULE EMPLOYED WITH THE SAME

(75) Inventors: Seunghyun Bang, Bucheon-si (KR); Jaesik Chung, Seoul (KR); Yong-ho Cho, Yongin-si (KR)

(73) Assignee: LG Chem, Ltd. (KR)

( * ) Notice: Subject to any disclaimer, the term of this patent is extended or adjusted under 35 U.S.C. 154(b) by 797 days.

(21) Appl. No.: 11/566,498

(22) Filed: Dec. 4, 2006

(65) Prior Publication Data
US 2007/0154793 A1  Jul. 5, 2007

Related U.S. Application Data

(63) Continuation-in-part of application No. 11/285,418, filed on Nov. 22, 2005, now abandoned.

(30) Foreign Application Priority Data

Nov. 26, 2004 (KR) .................. 10-2004-0097749

(51) Int. Cl.
*H01R 24/00* (2006.01)
(52) U.S. Cl. ...................................... 439/627

(58) Field of Classification Search .............. 439/627, 439/500, 502, 505, 881
See application file for complete search history.

(56) References Cited

U.S. PATENT DOCUMENTS

| | | | | |
|---|---|---|---|---|
| 1,460,604 A | * | 7/1923 | Potter | 439/627 |
| 5,158,842 A | * | 10/1992 | McHenry | 429/161 |
| 5,833,492 A | | 11/1998 | Lueder | |
| 5,948,559 A | * | 9/1999 | Snyder | 429/121 |
| 6,097,173 A | | 8/2000 | Bryant, Jr. | 320/107 |
| 6,186,831 B1 | * | 2/2001 | Tsai | 439/627 |
| 6,270,378 B1 | * | 8/2001 | Lee | 439/627 |

* cited by examiner

*Primary Examiner*—Javaid Nasri
(74) *Attorney, Agent, or Firm*—Cantor Colburn LLP

(57) ABSTRACT

Disclosed herein are an electrode connector including a conductive wire and a plurality of plates mounted on the wire such that the plates can be electrically connected to electrodes of cells, wherein the plates are electrically connected to the wire in a structure in which the plates are coupled to the wire by clamping, and a surface (A) of each plate contacting the wire is plated with the same metal (a) as the wire while a surface (B) of each plate connected to the corresponding electrode of each cell is plated with the same metal (b) as the corresponding electrode of each cell, and a battery module constructed with the electrode connector.

11 Claims, 5 Drawing Sheets

PRIOR ART

PRIOR ART

ELECTRODE CONNECTOR CONTAINING PLATE AND BATTERY MODULE EMPLOYED WITH THE SAME

FIELD OF THE INVENTION

The present invention relates to an electrode connector for connecting electrodes of cells with each other, and, more particularly, to an electrode connector including a conductive wire, and a plurality of plates mounted on the wire such that the plates can be electrically connected to electrodes of cells, wherein the plates are electrically connected to the wire in a structure in which the plates are coupled to the wire by clamping, and a surface (A) of each plate contacting the wire is plated with the same metal (a) as the wire while a surface (B) of each plate connected to the corresponding electrode of each cell is plated with the same metal (b) as the corresponding electrode of each cell. Also, the present invention relates to a battery module manufactured with such an electrode connector.

BACKGROUND OF THE INVENTION

As mobile devices have been increasingly developed, and the demand of such mobile devices has increased, the demand of secondary batteries has also sharply increased as a power source for the mobile devices. One of the secondary batteries is a lithium secondary battery having high energy density and discharge voltage, into which much research has been carried out and which is now commercially and widely used.

Based on kinds of external devices in which the secondary battery is used, the secondary battery may be used in the form of a single unit cell or in the form of a battery pack including a plurality of unit cells electrically connected with each other. For example, small-sized devices, such as a mobile phone, can be operated for a predetermined period of time from the output and the capacity of a single unit cell. On the other hand, large-sized devices, such as lap-top computers or electric vehicles, require use of a medium- or large-sized battery pack because a high output and a large capacity are necessary.

The battery pack is a battery structure including a plurality of unit cells electrically connected in series and/or parallel with each other. A wire, a plate, and a flexible printed circuit board (FPCB) are used in the battery pack so as to accomplish the electrical connection between electrodes of the unit cells.

The wire is a linear conductive member. Generally, an insulating resin is covered on the outer surface of the wire, and therefore, the wire has advantages in that the linear conductive member is easily deformed, and the costs of the liner conductive member are inexpensive. However, the wire has problems in that it is difficult to accomplish the electrical connection between the electrodes of the cells by a welding process, such as spot welding, ultrasonic welding, or laser welding, and a large amount of heat is transferred to the cells during the welding process, which causes damage to the cells.

The plate, which is a plate-shaped conductive member, has an advantage in that the electrical connection between the electrodes of the cells can be easily accomplished by the above-mentioned welding process. However, the plate has a problem in that it is difficult to accomplish the electrical connection between the electrodes of the cells even with only a slight-degree error.

The FPCB, which is widely used in recent years, has advantages in that the electrical connection between the electrodes of the cells can be easily accomplished like the plate, and it is suitable for the electrical connection in a complicated structure. However, the FPCB has problems in that the FPCB is very expensive, the formability is lowered, and the assembly operation is difficult.

Processes for constituting a battery module through the electrical connection between electrodes of a plurality of cells using an FPCB are partially shown in FIGS. 1 and 2. FIG. 1 illustrates a normal assembly process of the battery module in which the connection between the electrodes is normally accomplished, and FIG. 2 illustrates an abnormal assembly process of the battery module in which the connection between the electrodes is abnormally accomplished.

Referring to FIGS. 1 and 2, an FPCB 10 includes a flexible board 12, on which a circuit 14 is formed. To the circuit 14 are connected electrodes 22 of cells 20. When the connection circuit 14 of the FPCB 10 is properly arranged on the electrodes 22 of the cells 20, which are disposed regularly, as shown in FIG. 1, normal electrical connection between the electrodes is accomplished. When an error occurs at the first connection process as shown in FIG. 2, on the other hand, it is difficult to accomplish subsequent electrical connections between the electrodes. Consequently, the assembly operation is inaccurately carried out.

For a high-output, large-capacity battery module used in large-sized devices, such as electric vehicles and hybrid electric vehicles, high current flows during the charge and discharge of the battery module. Consequently, it is difficult to provide a desired output when the resistance at the electrically connected regions, for example, between the electrodes of the cells and the connector is high. According to circumstances, the electrode connector may be excessively heated, which considerably deteriorates the safety of the electrode connector.

SUMMARY OF THE INVENTION

Accordingly, it is an object of the present invention to substantially obviate the above-mentioned problems of the conventional arts as well as the technical problems requested from the past.

The inventors have performed various experiments and research, and finally have developed an electrode connector having advantages of both the wire and the plate. Specifically, the electrode connector includes a flexible wire and plates, which can be easily welded to electrodes of cells, mounted on the wire. Consequently, the electrode connector can be manufactured inexpensively, the assembly operation is easily carried out due to the characteristics of the deformable wire, and the electrical connection between the electrodes of the cells is accomplished by the plates, which can be easily welded to the electrodes. Furthermore, the same metal is used at the electrically connected regions, whereby the resistance at the connected regions is lowered. Consequently, the electrode connector exhibits excellent output characteristics and high safety even when high current flows.

In accordance with one aspect of the present invention, the above and other objects can be accomplished by the provision of an electrode connector comprising: a conductive wire; and a plurality of plates mounted on the wire such that the plates can be electrically connected to electrodes of cells, wherein the plates are electrically connected to the wire in a structure in which the plates are coupled to the wire by clamping, and a surface (A) of each plate contacting the wire is plated with the same metal (a) as the wire while a surface (B) of each plate connected to the corresponding electrode of each cell is plated with the same metal (b) as the corresponding electrode of each cell.

In the electrode connector according to the present invention, the electric connection between the electrodes of the cells is accomplished by the plates, and the interconnection between the plates is accomplished by the wire. Consequently, the coupling between the electrodes and the plates is easily accomplished. Also, the wire is flexible, and therefore, the electrical connection through the plates is accomplished irrespective of the distance between the electrodes.

Furthermore, the members interconnected or welded at the electrically connected regions are made of the same material. Consequently, the electrode connector exhibits excellent output characteristics and high safety, even when high current flows due to low resistance at the connected regions, in the case that the members are coupled by physical contact or by welding.

The conductive wire is a linear conductive member. Preferably, the conductive wire is covered with an insulating resin such that a short circuit to a peripheral device is prevented. The material for the wire is not particularly restricted so long as the material is conductive. For example, conductive materials generally used in electrical engineering applications, such as copper, iron, and lead, may be used for the wire. Preferably, the wire is made of copper, which has excellent flexibility and electrical conductivity.

The plates are plate-shaped conductive members, which are parts of the electrode connector and which are electrically connected to the electrodes of the cells. The material for the plates is not particularly restricted so long as the electrical connection between the plates and the electrodes of the cells is accomplished. For example, nickel, aluminum, copper, iron, and alloy thereof may be used for the plates. Preferably, the plates are made of nickel or nickel alloy, which is excellent in terms of cost and electrical conductivity.

The electrical connection between the plates and the electrodes of the cells may be accomplished in various manners. For example, the plates and the electrodes of the cells may be electrically connected with each other by welding, mechanical coupling, or adhesion. Preferably, the electrical connection between the plates and the electrodes of the cells is accomplished by spot welding, ultrasonic welding, laser welding, or soldering.

The coupling between the plates and the wire is accomplished by physical contact, for example, by clamping, with the result that contact resistance may occur. Also, when a welding or soldering operation is not easily performed during the electrical connection between the plates and the electrodes of the cells, the resistance at the connected regions may be high. Such high resistance at the electrically connected regions is not desirable for a high-output, large-capacity battery module in which high current flows.

In the electrode connector according to the present invention, on the other hand, the surface (A) of each plate contacting the wire is plated with the same metal (a) as the wire, and the surface (B) of each plate connected to the corresponding electrode of each cell is plated with the same metal (b) as the corresponding electrode of each cell. Consequently, the contact resistance between the plates and the wire is decreased, and the welding or soldering operation can be easily performed between the plates and the electrodes of the cells.

The kind of the metal (a) plated on the surface (A) is decided depending upon the material of the wire. When the wire is made of copper, the metal (a) plated on the surface (A) is copper.

The kind of the metal (b) plated on the surface (B) is decided depending upon the material of the electrodes of the cells. In common batteries, cathodes are made of aluminum, and anodes are made of copper. Consequently, the metal (b) plated on the surface (B) is aluminum or copper.

In a preferred embodiment, the surface (B) of each plate electrically connected with the corresponding electrode of each cell is provided with a step formed in a shape corresponding to the electrode of each cell.

The step facilitates the electrodes of the cells to be located at the corresponding regions of the plates for electrical connection. Especially, the step structure provides a higher coupling force than a non-step structure under the same coupling condition.

The size of the step is equal to or slightly greater than that of the corresponding electrode of each cell.

In accordance with another aspect of the present invention, there is provided a battery module manufactured with the electrode connector as described above.

The battery module includes two or more cells, which are electrically and mechanically connected with each other to provide high-output, large-capacity current, which cannot be obtained by a single cell. In the battery module is used a connector for connecting the unit cells in series and/or parallel with each other. The electrode connector serves to electrically connect a plurality of cells (unit cells), and therefore, the electrode connector is useful to connect the electrodes of the unit cells with each other and to connect the electrodes of the unit cells to a predetermined external device when manufacturing a medium- or large-sized battery module.

The structure of the battery module manufactured with two or more unit cells to provide high output and large capacity may be various. The structure of the battery module is well known to those skilled in the art to which the present invention pertains, and therefore, a detailed description thereof will not be given. It should be noted, however, that the structure of the battery module using the electrode connector according to the present invention falls into the scope of the present invention.

Preferably, the battery module according to the present invention is used in a battery pack, which is a power source for small-sized devices, such as lap-top computers, and large-sized devices, such as electric vehicles or hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF REFERENCE NUMERALS

100: electrode connector

200: wire

300: plate

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 3:
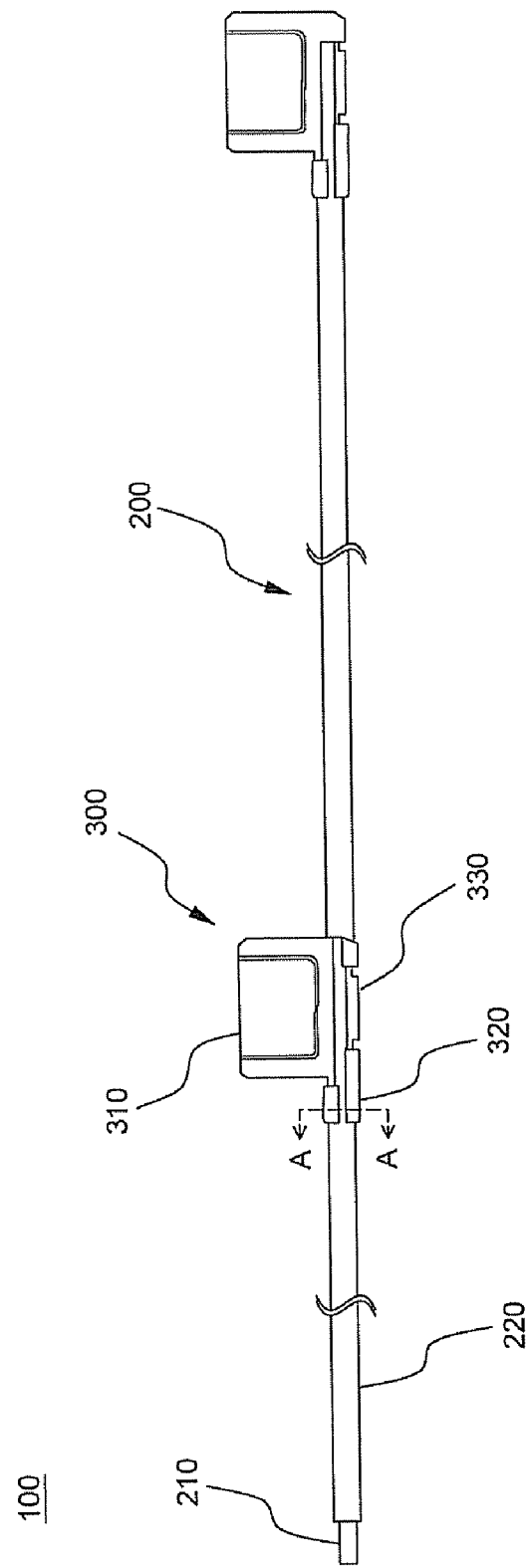
FIG. 3 is a partial typical view illustrating an electrode connector according to a preferred embodiment of the present invention.

FIG. 3 is a partial typical view illustrating an electrode connector 100 according to a preferred embodiment of the present invention.

Referring to FIG. 3, the electrode connector 100 includes a wire 200 and a plurality of plates 300 mounted on the wire 200. The wire 200 includes a conductive core member 210 and an insulating sheath 220 for covering the conductive core member 210.

Figure 4:
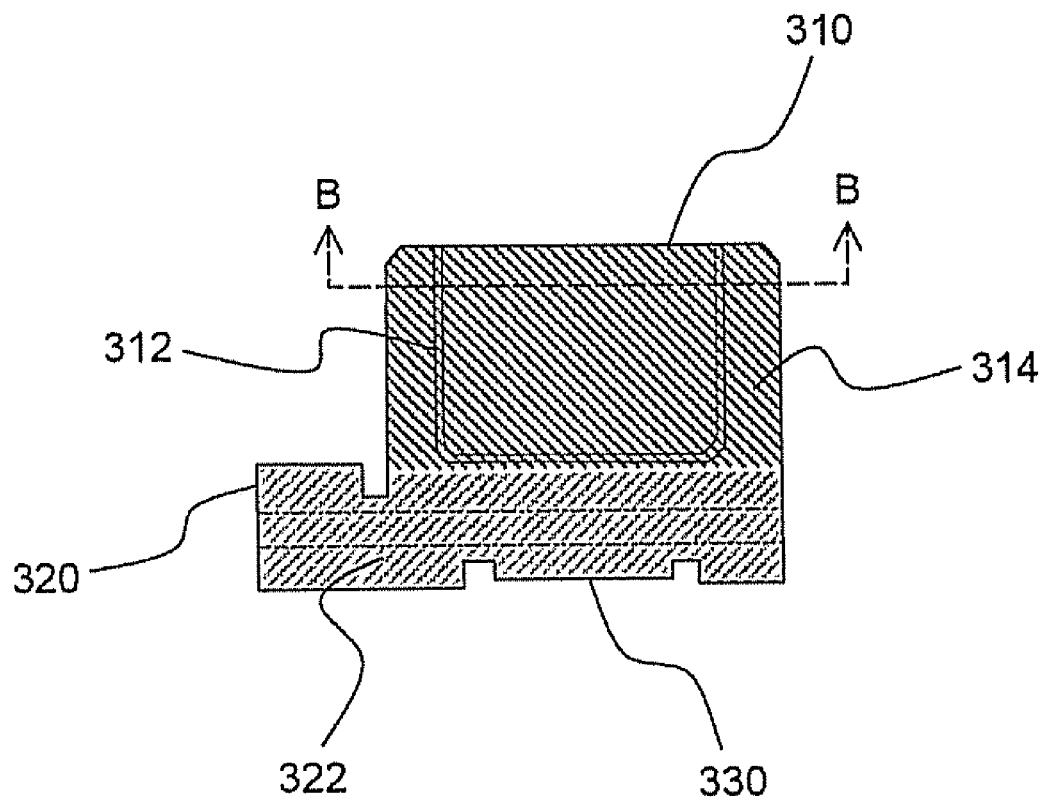
FIG. 4 is a typical view illustrating an exemplary plate used in the electrode connector according to the present invention.

The structure of the plate 300 is shown in more detail in FIG. 4. As shown in FIG. 4, the plate 300 has a side clamping part 320 formed at one side end of a plate-shaped body 310 and a lower clamping part 330 formed at the lower end of the plate-shaped body 310. The plate 300 is securely mounted on the wire core member 210 (chain double-dashed line) by the clamping parts 320 and 330, and therefore, the electrical connection between the plate and the wire is accomplished. The side clamping part 320 may be formed at the other side end of the plate-shaped body 310. Each electrode of cells (not shown) is electrically connected to the plate-shaped body 310, preferably, by welding.

Referring back to FIG. 3, the conductive core member 210 is exposed at the area of the wire 200 where the plate 300 is mounted. Consequently, the plate 300 is connected to the wire 200 by the clamping parts 320 and 330 of the plate 300, and therefore, the electrical connection between the plate and the wire is accomplished.

Figure 5:
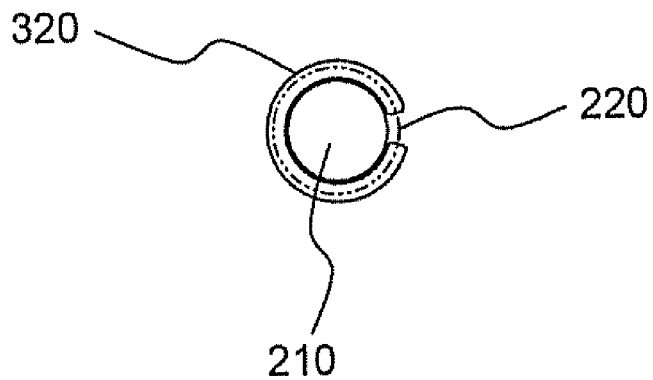
FIG. 5 is a sectional view taken along line A-A of FIG. 3.

FIG. 5 is a sectional view taken along line A-A of FIG. 3. The insulating sheath 220 (chain double-dashed line) is not present at the area of the wire where the plate is connected to the wire. Consequently, the conductive core member 210 is brought into direct contact with the side clamping part 320 of the plate 300, and therefore, the electrical connection between the plate and the wire is accomplished.

Referring back to FIG. 4, the plate-shaped body 310 of the plate 300, which is in direct contact with an electrode of a cell (not shown) and is electrically connected with the electrode of the cell, is provided with a step 312 formed in a shape corresponding to the electrode of the cell. The step 312 is plated with the same metal as the electrode of the cell at a surface 314 thereof.

Figure 6:
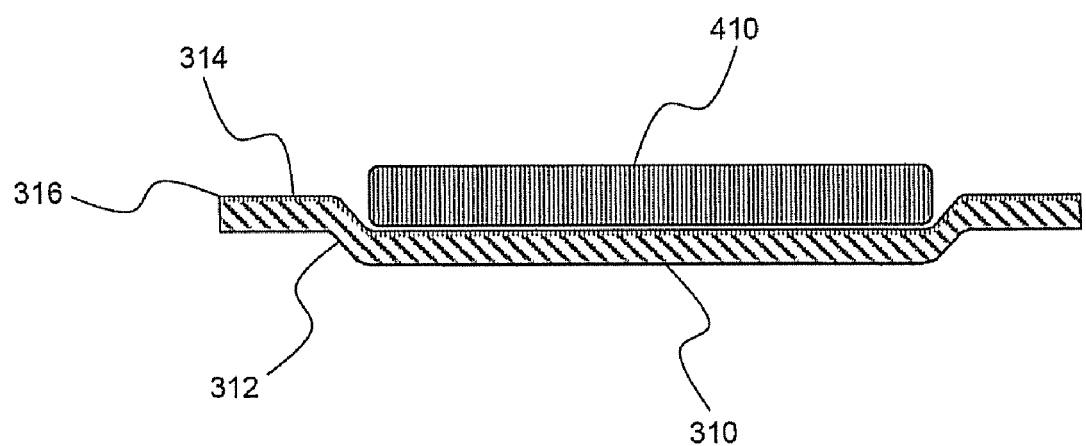
FIG. 6 is a sectional view taken along line B-B of FIG. 4.

FIG. 6 is a sectional view taken along line B-B of FIG. 4. Referring to FIG. 6, the step 312 is formed at the plate-shaped body 310 of the plate 300. The size of the step 312 approximately corresponds to that of an electrode 410 of a cell. A thin plating layer 316 is formed on the surface 314 of the step 312. Consequently, it is easy to properly locate the electrode 410 at the plate-shaped body 310 of the plate 300, and it is possible to provide a high coupling force when welding is performed.

Referring back to FIG. 4, a clamping part surface 322 of the plate 300, which is in contact with the conductive core member 210, is plated with the same metal as the conductive core member 210. Consequently, it is possible to maximally reduce the contact resistance when the plate 300 is coupled by clamping.

Figure 7:
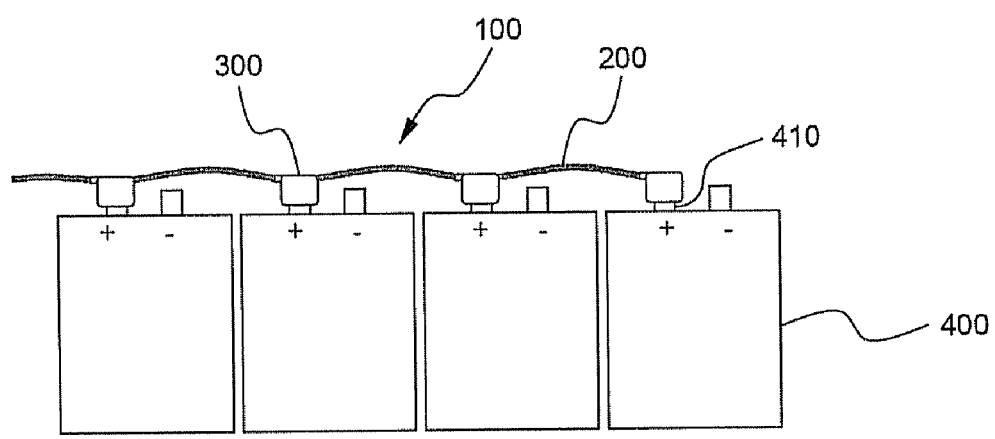
FIG. 7 is a typical view illustrating a structure in which a plurality of cells are electrically connected with each other by an electrode connector according to a preferred embodiment of the present invention.

FIG. 7 is a partial typical view illustrating a structure in which a plurality of cells are electrically connected with each other by an electrode connector according to a preferred embodiment of the present invention. For convenience and ease of description, only cathodes of the cells are shown to be connected with each other.

Figure 1:
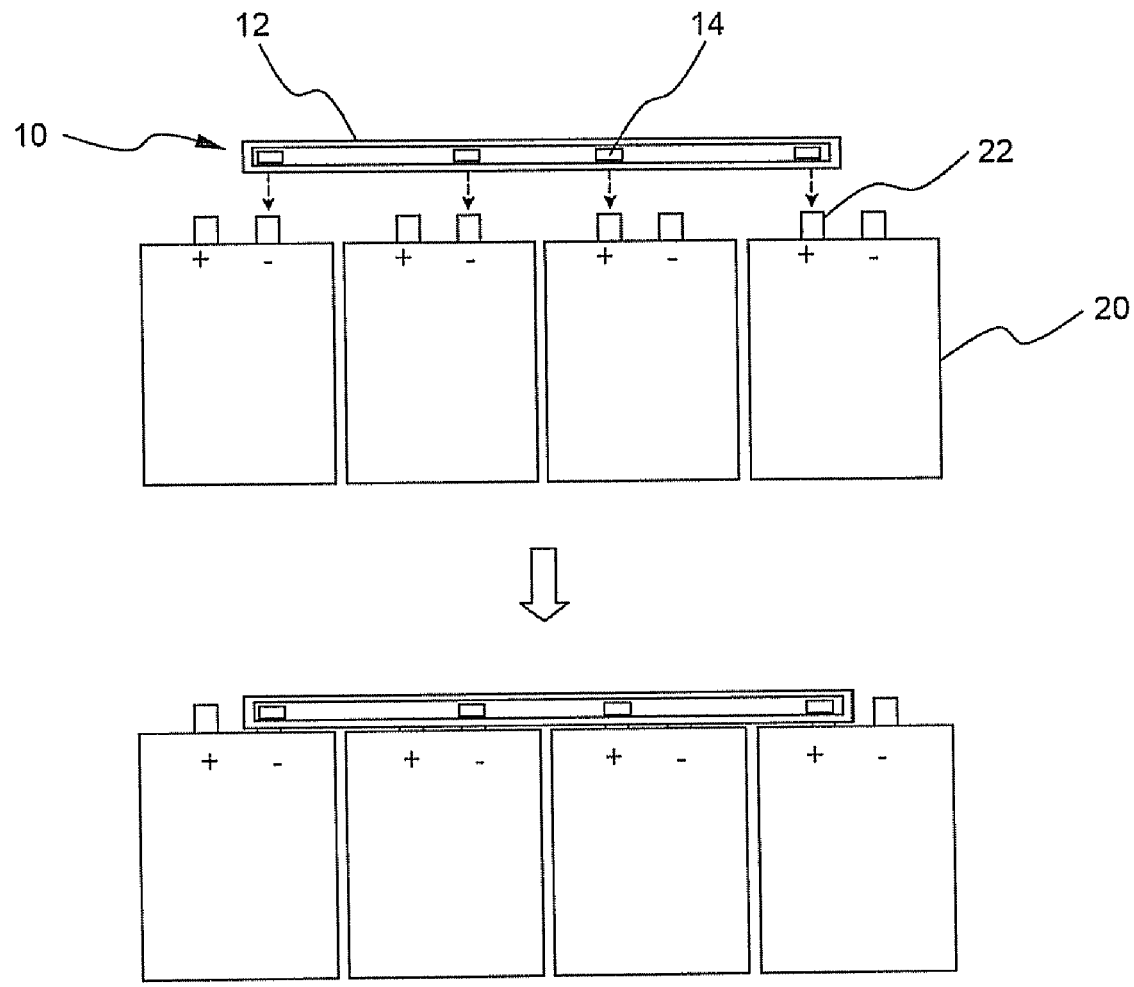
FIGS. 1 and 2 are typical views respectively illustrating normal and abnormal assembly processes when electrodes of cells are connected with each other using a flexible printed circuit board (FPCB) according to a conventional art.
Figure 2:
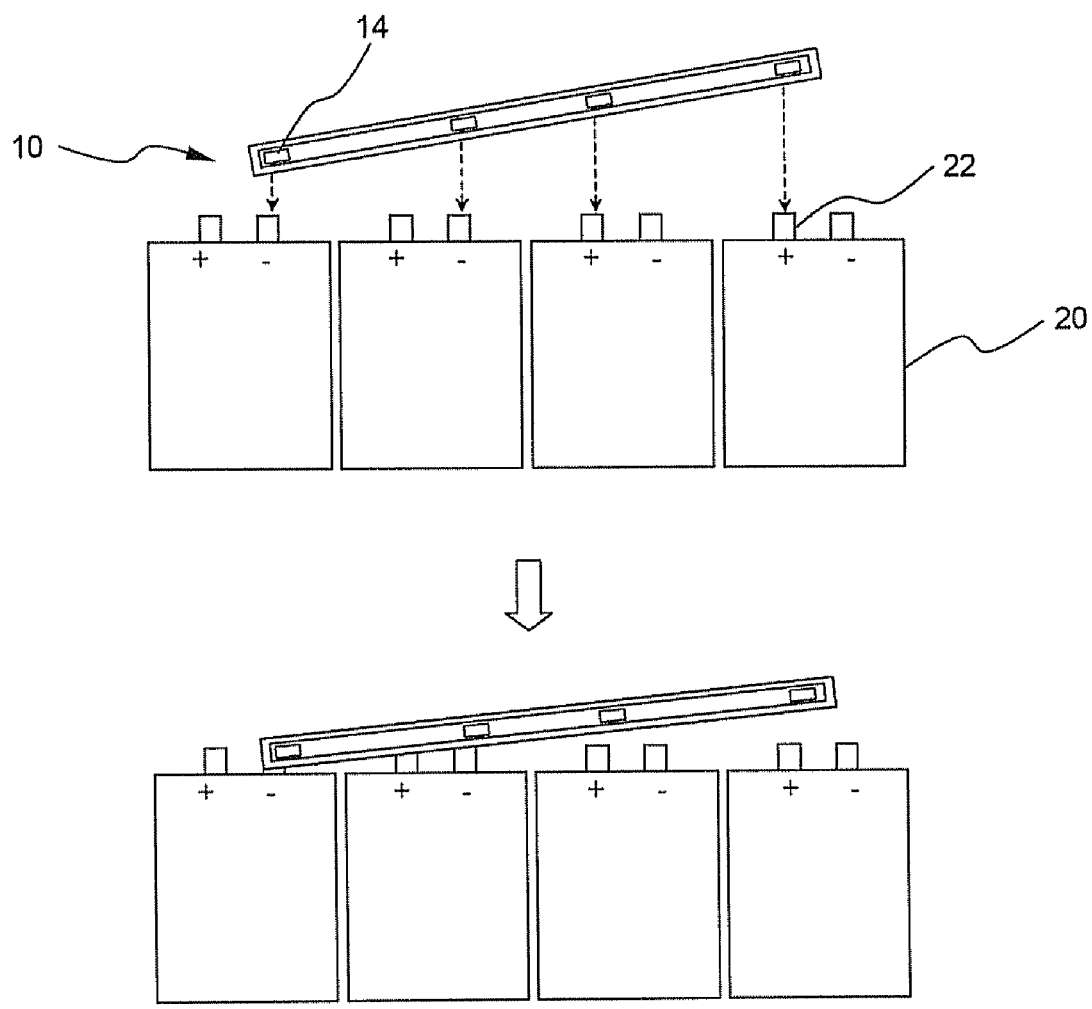

Referring to FIG. 7, the electrode connector 100 is constructed in a structure in which the plates 300 are welded to the cathodes 410 of the cells 400, respectively, and the plates 300 are connected with each other via the wire 200. The connection between the electrodes of the cells is accomplished by the plates 300, and the interconnection between the plates 300 is accomplished by the flexible wire 200. Consequently, the electrical connection is very easily accomplished, and therefore, the occurrence of the problems as in FIG. 2 is effectively prevented.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

For example, the structure of the plate and the electrical connection between the plate and the wire may be modified in various ways based on the illustrative example of FIG. 3.

INDUSTRIAL APPLICABILITY

As apparent from the above description, the electrode connector according to the present invention is electrically connected to the electrodes of the cells by means of the plates. Consequently, the coupling of the electrode connector to the electrodes of the cells is easily accomplished by welding while damage to the cells is minimized. Furthermore, the electrical connection between the plates is accomplished by means of the flexible wire. Consequently, the assembly operation for the electrode connection is very easily carried out, and the electrode connector can be manufactured inexpensively.

What is claimed is:

1. An electrode connector comprising:
   a conductive wire having a wire core member; and
   a plurality of plates mounted on the wire such that the plates can be electrically connected to electrodes of cells, wherein
   the plates are electrically connected to the wire in a structure in which the plates are coupled to the wire by clamping, and
   a surface (A) of each plate contacting the wire is plated with the same metal (a) as the wire while a surface (B) of each plate connected to the corresponding electrode of each cell is plated with the same metal (b) as the corresponding electrode of each cell, wherein each plate has a side clamping part formed at one side end of a plate-shaped body and a lower clamping part formed at the lower end of the plate-shaped body, and is securely mounted on the wire core member by the clamping parts.

2. The electrode connector as set forth in claim 1, wherein the wire is covered with an insulating resin.

3. A battery module manufactured with an electrode connector as set forth in claim 2.

4. The electrode connector as set forth in claim 1,
   wherein the wire is made of copper, and the plates are made of nickel, and
   wherein the metal (a) plated on the surface (A) is copper, and the metal (b) plated on the surface (B) is aluminum or copper.

5. A battery module manufactured with an electrode connector as set forth in claim 4.

6. The electrode connector as set forth in claim 1, wherein the electrical connection between the plates and the electrode of the cells is accomplished by spot welding, ultrasonic welding, laser welding, or soldering.

7. A battery module manufactured with an electrode connector as set forth in claim 6.

8. The electrode connector as set forth in claim 1, wherein the surface (B) is provided with a step formed in a shape corresponding to the electrode of each cell.

9. A battery module manufactured with an electrode connector as set forth in claim 8.

10. A battery module manufactured with an electrode connector as set forth in claim 1.

11. The battery module as set forth in claim 10, wherein the electrode connector is used to connect electrodes of a plurality of cells (unit cells) with each other or to connect the electrode of one of the unit cells with a predetermined external device.

* * * * *